United States Patent Office.

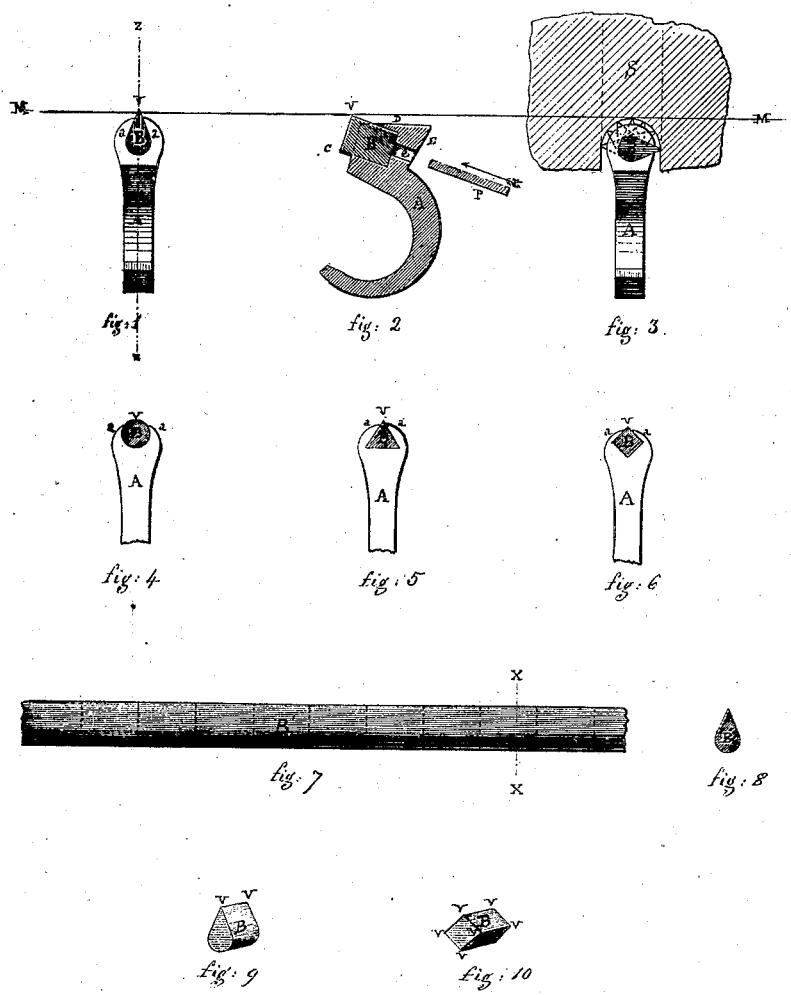
H. & J.L. Young,
Diamond Saw.
No. 99,514. Patented Feb. 1, 1870.

HUGH YOUNG, OF MIDDLETOWN, CONNECTICUT, AND JAMES L. YOUNG, OF NEW YORK, N. Y.

Letters Patent No. 99,514, dated February 1, 1870.

IMPROVED TOOL FOR CUTTING STONE, &c.

The Schedule referred to in these Letters Patent and making part of the same.

*To all whom it may concern:*

Be it known that we, HUGH YOUNG, of Middletown, in the county of Middlesex, and State of Connecticut, and JAMES L. YOUNG, of New York, in the county and State of New York, have invented certain Improvements in Tools for Cutting Stone, Iron, and other Hard Substances; and we do hereby declare that the following is a full and exact description thereof, reference being had to the accompanying drawings, forming part of this, our specification, in which—

Figure 1 represents a front view of our improved cutter-block and cutter;

Figure 2 is a vertical section of the same through the line Z Z;

Figure 3 represents cutters in action, showing, by dotted lines, the positions of steel points in the different cutter-blocks, and the action of the cutters upon the stone;

Figures 4, 5, and 6, are shapes of cutters;

Figure 7 represents a bar of steel; and

Figure 8, the end or cross-section X X of the same, to illustrate the mode of manufacture of our improved cutters; and Figures 9 and 10 are perspective views of our improved cutters.

This invention relates to that class of tools which is used for cutting stones, iron, and other hard substances, by means of the multiplied scratches of mineral-carbon points; and Our improvements consist in replacing said mineral-carbon points by small type-like cutters or points of chrome-steel, ferro-manganese, silicon-steel, or other hard steels, and in the mode of setting the same in the blocks or teeth, whereby an efficient, accurate, durable, and cheap tool is obtained, susceptible of being applied to many wants of the arts.

We will describe one of our improved cutters and cutter-blocks, and illustrate several variations of shape which it may assume. The block itself may be made of any approved shape to be applied to saws, milling-tools, planers, &c.; and we do not claim any invention in the mode of securing said block, having used, in our illustration, the shape of a well-known and successful one.

In the tools protected by mineral carbon, the irregular shape and size of the stones, their friability, scarcity, and price, are serious objections to their general introduction in the arts.

We have taken for starting-point, in making our improvement, the procuring of a suitable substitute for mineral carbon; and, having accomplished that end by means of small type-like cutters of very hard steel, we have sought the best mode of setting the same in the blocks or teeth of a tool, so as to have the cutter supported, braced, strengthened by the cutter-block, and have it arranged to remove and insert new cutters in the block with little trouble.

A is the cutter-block or teeth, which is to be fastened to the saw or other tool by any approved mode.

B is the cutter or type-like tool, made of chrome-steel, ferro-manganese, silicon-steel, or any other hard steel.

To make these type-like cutters, we employ bars of steel, fig. 7, worked to the proper cross-section, as figs. 8, 4, 5, and 6, and of indefinite length. This bar or bars, we saw into length, as indicated by the dotted lines, fig. 7. These are now set, type-like, into a form, and ground on both ends, so as to obtain perfect uniformity of length, and a perfect flat end. These type-like cutters are now tempered as hard as possible, and are kept ready for use, as below described.

Figs. 9 and 10 show two different shapes of type-like cutter. In fig. 9, there are only two cutting-points, V; and these cutters can only be inserted twice; but in fig. 10, there are eight cutting-points, so that, when required, this same cutter may be used eight times, by changing its position in the block A.

The block A has a hole bored from its face, c, at a proper angle with the line of motion, M M, of the cutter-block, and of such a depth, that when a type-like cutter is inserted therein, until it is home, the point V of the cutter will project over the top D of the block A.

A small hole, e, is bored from the back part E of the block, through which a small blunt punch, P, may be used to drive out the cutter B, when it is desired to remove it from the block, and replace it by a new one.

By this arrangement, we are enabled to obtain a tool having the maximum of hardness of steel for the cutting-point V, without any danger of said cutting-point breaking, as it is so well stayed, braced, and strengthened, by the surrounding block fitting closely around and against the same.

We have not in contemplation the manufacture of circular saws, milling-tools, &c., as they are now made; but what we aim at is to obtain a tool presenting a great many points of very hard steel, having only a small cutting-point, V, exposed, so as to cut by multiplied scratches made by these small points V, and to obtain a cheap and manageable manner of keeping such a tool in order, by replacing, at any time, the cutting-points V.

The working of the cutters is illustrated in fig. 3, and the mode of keeping our tool in order is obtained by our system of type-like hard-steel cutters.

*Claim.*

The cutter B, of hard steel, combined with the block A of a milling-tool, circular saw, or wheel, when said cutter is embedded into said block, and both are made in the manner and used for the purpose set forth.

HUGH YOUNG. [L. S.]
     JAMES L. YOUNG. [L. S.]

Witnesses:
 JON. BELL,
 H. GENGEMBRE HUBERT.